United States Patent
Hartel

(10) Patent No.: US 6,449,141 B1
(45) Date of Patent: Sep. 10, 2002

(54) KIT FOR A HOUSING

(76) Inventor: Marc Hartel, Freiherr-von -Stein-Str. 17, D-35447 Reiskirchen (DE)

(*) Notice: Subject to any disclaimer, the term of this patent is extended or adjusted under 35 U.S.C. 154(b) by 0 days.

(21) Appl. No.: 09/523,597

(22) Filed: Mar. 15, 2000

(30) Foreign Application Priority Data

Mar. 16, 1999 (DE) .......................... 199 11 625

(51) Int. Cl.$^7$ ................................ H02G 3/14
(52) U.S. Cl. ................ 361/679; 361/625; 361/641; 174/66; 174/48; 312/321.5; 312/264; 312/257.1
(58) Field of Search ................ 361/625, 641, 361/679, 736, 730–732, 735, 610, 800, 826, 832, 837; 174/48, 52.1, 37, 38, 50, 52, 53, 54, 56, 66; 220/327, 3.2, 210, 330, 331, 329, 332, 333, 334, 335–338, 3.8, 244, 242, 4.02; 312/223.1, 223.6, 317.12, 263, 265.5, 257.1, 140; 248/226.8, 225.21; 109/59 R; 411/84

(56) References Cited

U.S. PATENT DOCUMENTS 3,681,663 A * 8/1972 Albers ..................... 317/100
4,769,739 A * 9/1988 De Bruin .................. 361/335
5,568,362 A * 10/1996 Hansson ................... 361/736
5,577,603 A * 11/1996 Bogdanovs et al. ........ 200/331

FOREIGN PATENT DOCUMENTS

DE 43 33 031 3/1995
DE 195 47 135 4/1997

* cited by examiner

Primary Examiner—Darren Schuberg
Assistant Examiner—Michael Datskovsky

(57) ABSTRACT

A housing for receiving electric and/or electronic components, having a housing body, with a front that can be closed by a front door and an open back that can be closed with a rear covering, wherein the covering can be attached to the body in an exchangeable manner. To use such a housing selectively and in a simple manner as a housing standing on its own, or as a housing installed on a wall, with the rear covering removed, a suspension device is installed on the housing body, which has a wall that covers the open back of the housing. The suspension device has two or several fastening elements, which have fastening receivers accessible from the exterior of the housing.

12 Claims, 1 Drawing Sheet

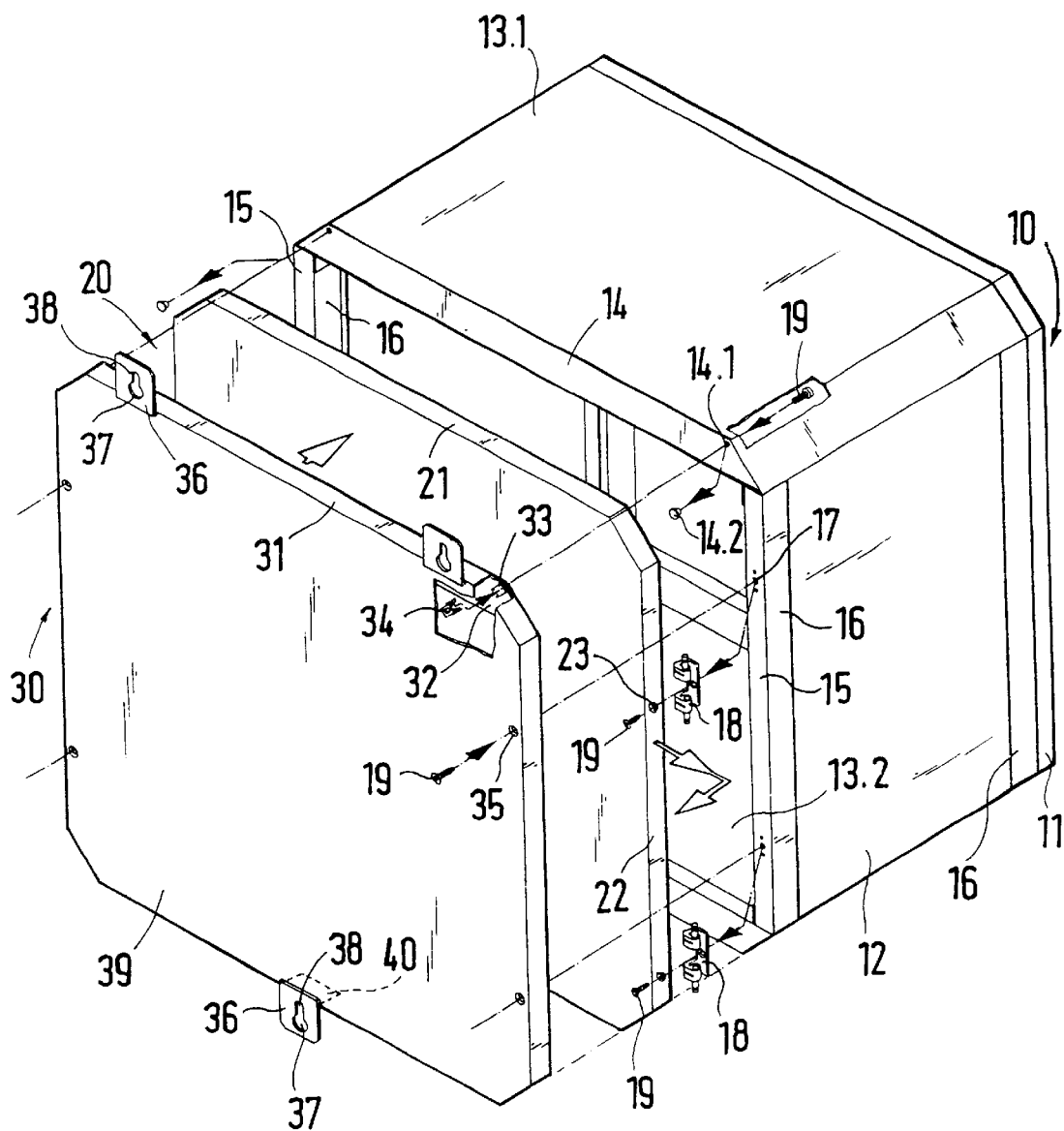

KIT FOR A HOUSING

BACKGROUND OF THE INVENTION

1. Field of the Invention

This invention relates to a housing for receiving electric and/or electronic components, having a housing body, with a front that can be closed by a front door and with an open back that can be closed with a rear covering that can be attached to the body in an exchangeable manner.

2. Description of Prior Art

A switchgear cabinet having a rack is known from German Patent Reference DE 43 33 031 A1. This rack can be enclosed by lateral walls, a rear covering and a front door. A roof is placed on the top of the rack. The roof has an opening at the rear, into which vertical supporting braces are placed. The supporting braces are connected with the rear vertical profiled frame sections of the rack. The rack can be fastened on the ceiling or a wall of a room using support braces.

German Patent Reference DE 195 47 135 C1 shows a housing installed on a wall, which has a box-shaped base element. The base element has a rear wall, from which four lateral walls are beveled off in one piece. The open front of the base element can be enclosed by two hood-like partial doors. The rear wall has fastening receivers, by which the housing can be installed on a wall. The housing installed on a wall is intended for receiving only light loads.

SUMMARY OF THE INVENTION

It is one object of this invention to provide a housing of the type mentioned above but which can be installed on a wall or stand alone, wherein the change between the individual types of use can be simply performed, and wherein secure and solid fastening is assured for a type installed on a wall.

This object of the invention is achieved with the rear covering removed and a suspension device installed on the housing body, which has a wall that covers the open back of the housing. The suspension device is equipped with two or several fastening elements, which have fastening receivers accessible from an exterior of the housing.

In accordance with this invention, it is selectively possible, depending on the type of use, to fasten either the rear covering or the wall suspension device on the housing body. As a separate component, the suspension device can be designed statically in such a way that a dependable support of high loads is assured. With the removable covering, or respectively suspension device, it is possible to make the rear portion of the inner housing chamber accessible independently of the type of use. Installation operations inside the housing body can thus be easily performed. Installation on a wall can be easily performed because of the fastening brackets, which are easily accessible from the outside.

If the fastening brackets each have a fastening receiver, which is embodied as an opening and tapers opposite the direction of the force of gravity, an installation of the housing on a wall can be easily performed. For this purpose the housing is initially pushed on the wall fastening, for example using screws provided with dowels, with fastening receivers of the fastening brackets, and is then lowered. Pre-fixation of the housing in place is thus provided. The fastening brackets of the already hung housing can then be clamped to the wall.

In one design of this invention, the fastening brackets are arranged in the area of the upper horizontal edge of the rear suspension device and project past the latter and are easily accessible.

In this case, also at least one fastening bracket is applied at the lower horizontal edge of the rear suspension device, which projects past the underside of the housing body. It is thus prevented that the housing tilts away from the wall, for example when a pulling force is exerted on the front door.

To prevent the wall of the attachment device from becoming deformed because of unevenness in the wall, the fastening brackets are connected via a spacer with the suspension device. The fastening bracket has a flat contact face, and the spacer maintains the contact face spaced apart from the wall. When using three fastening brackets it is then possible to realize a statically unequivocally defined three point fastening.

To reduce the outlay for parts and manufacturing, the rear covering is hinged to the housing body by means of hinges, wherein a hinge element of the hinge is screwed to a connecting edge which extends parallel with respect to the rear of the housing body. With the hinge element disassembled, the suspension device can be fixed in place on the fastening receiver for the hinge element by a fastening screw.

In one embodiment of this invention, a continuous edge, which projects in the direction toward the housing body, is bent away from the wall of the suspension device. A fastening flange is angled off the edge on at least two oppositely located sides of the suspension device and is oriented toward the inside of the housing and lies parallel with respect to the wall of the suspension device. The fastening flange has fastening receivers in which cage nuts are fastened. The fastening flange rests on an edge of the housing body. A fastening screw is passed through a screw receptacle and is screwed into the cage nut. This construction of the fastening device is useful for supporting large loads. A rigid construction results if the fastening flange is connected, for example welded, with two longitudinal ends with the facing edge extending at right angles with respect to the fastening flange.

Good load support can also be achieved if the housing body has horizontal and/or vertical profiled frame sections, to which the suspension device is screwed.

BRIEF DESCRIPTION OF THE DRAWINGS

This invention is explained in greater detail by an exemplary embodiment represented in the drawings wherein the single drawing FIGURE shows a housing in a perspective exploded view.

DESCRIPTION OF PREFERRED EMBODIMENTS

The housing has a housing body 10, which has a rack with four vertical profiled frame sections 16. The rack can be enclosed by means of lateral walls 12, a front door 11, a ceiling 13.1 and a bottom 13.2. The ceiling 13.1 and the bottom 13.2 have a beveled edge 14 extending parallel with respect to the open rear of the housing body 10. Screw receptacles 14.1 are cut into the edge 14. The edge 14 transitions into a connecting edge 15 of the vertical profiled frame sections 16. A continuous contact surface results from the edge 14 and the connecting edge 15, which frames the open rear of the housing body 10. The right side connecting edge 15 has fastening receivers 17. Hinge elements 18 of hinges are preferably screwed by means of fastening screws 19 to the fastening receivers 17. The hinges form a vertical joint axis, and a rear covering 20, which is pivotal about it, and can be attached to the housing body 10. The covering 20 has a flat back wall, from which a continuous edge 21 is beveled. The edge 21 projects in the direction toward the housing body 10. On its end facing away from the wall, the edge 21 is bent at right angles, which results in a fastening flange 22. The two vertical portions of the fastening flange 22 have screw receptacles 23. The covering 20 can be placed level on the edge 14, or respectively on the connecting edge 15, with its fastening flange 22. An appropriate seal can be used for sealing the transition area between the fastening flange 22 and the edge 14, or respectively the connecting edge 15. On its area facing away from the hinge side, the covering 20 can be maintained on the housing body 10 by means of a locking device.

As shown in the drawing, the screw receptacles 14.1 can be closed off by means of blind plugs 14.2.

A rear suspension device 30 can be fastened on the housing body 10 instead of the covering 20. The suspension device 30 has a rear wall 39, from which a continuous edge 31 is beveled off at right angles. The edge 31 projects in the direction toward the housing body 10. Fastening flanges 32 are angled off from the edge 31 in the area of the upper and lower edge area. The fastening flanges 32 are oriented parallel with respect to the wall 39. Fastening receivers 33 are cut into the fastening flanges 32 in the corner areas of the covering 20. Cage nuts 34 can be inserted into the fastening receivers 33. The suspension device 30 has respectively two screw receptacles 35 in its two vertical edge areas.

Two fastening brackets 36 are arranged at the upper horizontal edge area of the suspension device 30. A fastening bracket 36 is at the lower edge area. The fastening brackets 36 are identically constructed and have a flat plate section, which is coupled to the wall 39 via a spacer (40), as shown in phantom in the drawing. The spacer (40) maintains the rear flat connecting surface of the fastening brackets 36 at a distance from the wall 39. A circular fastening receiver 37 is cut into the plate section. The fastening receiver 37 transitions into a tapered end 38 opposite the direction of the force of gravity.

The suspension device 30 can be installed on the housing body 10 instead of on the rear covering 20. Thus the fastening flange 32 of the suspension device 30 is placed on the edge 14 of the ceiling 13.1 and the bottom 13.2. In this case the cage nuts 34 are aligned with the screw receptacles 14.1 of the edge 14. The screw receptacles 35 of the suspension device 30 are aligned flush with the fastening receivers 17 which were originally used for fastening the hinge elements 18. Then the suspension device 30 can be clamped together with the housing body 20 by means of fastening screws 19.

The housing can be installed on a wall by means of the suspension device 30. Three bore holes, which are aligned with fastening receivers 37 of the fastening bracket 36, are drilled into the wall. In the disassembled state, the suspension device 30 can be used as a drilling template. Then dowels are inserted into the bore holes and holding screws are turned into them. The housing can be suspended from the holding screws with the aid of the fastening brackets 36. This is possible in a simple manner because the screw heads are pushed through the large-sized fastening receivers 37. The housing can subsequently be lowered in the direction of the force of gravity, and in the process the holding screws engage with the tapered ends 38. The holding screws can then be tightened, so that the fastening brackets 36 are clamped to the wall.

What is claimed is:

1. In a housing for receiving at least one of electric and electronic components, having a housing body with a front closed by a front door and an open back closed with either a rear covering or a suspension device, wherein the rear covering is removably attached to the body, the improvement comprising:

the suspension device (30) installed on the housing body (10) and having a wall (39) covering the open back of the housing body (10);

the suspension device (30) having a plurality of fastening elements with fastening receivers accessible from an exterior of the housing, the suspension device (30) having a continuous edge (31) bent away from the wall (39) of the suspension device (30) and projecting in a direction toward the housing body (10);

a fastening flange (32) angled off the edge (31) on at least two oppositely located sides of the suspension device (30) and oriented toward an inside of the housing and parallel with respect to the wall (39) of the suspension device (30);

the fastening flange (32) having fastening receivers (33) in which cage nuts (34) are fastened;

the fastening flange (32) positioned flat on an edge (14) of the housing body (10); and a fastening screw (19) passed through a screw receptacle (14.1) and screwed into one of the cage nuts (34).

2. In the housing in accordance with claim 1, wherein the fastening elements are fastening brackets (36) each having a fastening receiver embodied as an opening (37) and tapering opposite a direction of a force of gravity.

3. In the housing in accordance with claim 2, wherein a plurality of fastening brackets (36) are arranged in an area of an upper horizontal edge of the suspension device (30) and project beyond the upper horizontal edge.

4. In the housing in accordance with claim 3, wherein at least one of the fastening brackets (36) is applied at a lower horizontal edge of the suspension device (30) which projects beyond an underside of the housing body (10).

5. In the housing in accordance with claim 4, wherein the fastening brackets (36) are connected by a spacer with the suspension device (30), each of the fastening brackets (36) has a flat contact face, and the spacer maintains the contact face spaced apart from the wall (39).

6. In the housing in accordance with claim 5, wherein the suspension device (30) is fixed in place on a connecting edge (15) of the housing body (10) by a second fastening screw (19) through a fastening receiver (17) which interchangeably holds a hinge element (18) of hinges connecting the rear covering (20) to the housing body (10).

7. In the housing in accordance with claim 6, wherein the housing body (10) has at least one of horizontal and vertical profiled frame sections (16) to which the suspension device (30) is screwed.

8. In the housing in accordance with claim 1, wherein a plurality of fastening brackets (36) are arranged in an area of an upper horizontal edge of the suspension device (30) and project beyond the upper horizontal edge.

9. In the housing in accordance with claim 1, wherein at least one of a plurality of fastening brackets (36) is applied at a lower horizontal edge of the suspension device (30) which projects beyond an underside of the housing body (10).

10. In the housing in accordance with claim 1, wherein a plurality of fastening brackets (36) are connected by a spacer with the suspension device (30), each of the fastening brackets (36) has a flat contact face, and the spacer maintains the contact face spaced apart from the wall (39).

11. In the housing in accordance with claim 1, wherein the suspension device (30) is fixed in place on a connecting edge (15) of the housing body (10) by a second fastening screw (19) through a fastening receiver (17) which interchangeably holds a hinge element (18) of hinges connecting the rear covering (20) to the housing body (10).

12. In the housing in accordance with claim 1, wherein the housing body (10) has at least one of horizontal and vertical profiled frame sections 16 to which the suspension device (30) is screwed.

* * * * *